United States Patent
Chou

(10) Patent No.: US 6,715,446 B2
(45) Date of Patent: Apr. 6, 2004

(54) PET TENT

(75) Inventor: David K. Y. Chou, Hayward, CA (US)

(73) Assignee: Yuntek International, Inc., Hayward, CA (US)

( * ) Notice: Subject to any disclaimer, the term of this patent is extended or adjusted under 35 U.S.C. 154(b) by 0 days.

(21) Appl. No.: 10/290,553

(22) Filed: Nov. 8, 2002

(65) Prior Publication Data

US 2003/0089316 A1 May 15, 2003

(30) Foreign Application Priority Data

Nov. 9, 2001 (CN) ..................... 01 2 57894 U

(51) Int. Cl.[7] ............ A01K 29/00; A01K 13/00; A45C 7/00; E04H 15/40
(52) U.S. Cl. .............. 119/497; 119/498; 190/107; 135/126; 135/128
(58) Field of Search ............... 119/497, 482, 119/496, 474, 498, 500, 786, 453; D30/108, 109; 190/102, 107, 108, 114, 124; 206/278; 135/95, 124, 126, 128

(56) References Cited

U.S. PATENT DOCUMENTS

| | | | | |
|---|---|---|---|---|
| 611,753 A | * | 10/1898 | Hoskins | 43/55 |
| 1,443,901 A | * | 1/1923 | Murray | 220/6 |
| 2,121,658 A | * | 6/1938 | Gehret | 119/474 |
| 2,170,379 A | | 8/1939 | Ortt | |
| 2,254,578 A | * | 9/1941 | O'Brien | 190/107 |
| 2,516,869 A | * | 8/1950 | Harris | 135/126 |
| 2,538,778 A | | 1/1951 | Halpin | |
| 2,987,043 A | * | 6/1961 | Spindler | 119/786 |
| 3,048,147 A | * | 8/1962 | McKean | 220/6 |
| 3,611,994 A | * | 10/1971 | Bailey et al. | 119/496 |
| 3,675,667 A | * | 7/1972 | Miller | 135/126 |
| 4,397,398 A | * | 8/1983 | Watanabe | 220/7 |
| 4,665,935 A | * | 5/1987 | Nichols | 135/125 |
| 4,895,230 A | * | 1/1990 | King | 190/107 |
| 4,909,188 A | * | 3/1990 | Tominaga | 119/474 |
| 4,977,857 A | * | 12/1990 | Slawinski | 119/497 |
| 5,016,570 A | * | 5/1991 | Henson | 119/497 |
| 5,072,694 A | * | 12/1991 | Haynes et al. | 119/482 |
| 5,078,096 A | * | 1/1992 | Bishop et al. | 119/497 |
| 5,881,678 A | * | 3/1999 | Morley | 119/496 |

(List continued on next page.)

FOREIGN PATENT DOCUMENTS

| | | |
|---|---|---|
| GB | 2029204 A | 3/1980 |
| WO | WO 94/18822 * | 9/1994 |

OTHER PUBLICATIONS

Doskocil Manufacturing Company Website Home Page, available at www.petmate.com (accessed Jan. 24, 2003).
Doskocil Manufacturing Company Website for Portable Pet Homes, available at www.petmate.com/Catalog.plx?ID=1559 (accessed Jan. 24, 2003).

Primary Examiner—Yvonne Abbott
(74) Attorney, Agent, or Firm—Fliesler Meyer LLP

(57) ABSTRACT

A collapsible tent 100 for housing a pet which folds into a storage bag when not in use. The design and structure is as follows of the tent includes a main body 1, front 2 and back 3 panels. The frame of the front 2 and back 3 panels are in the "upside down U" (dome) shape; the top and sides of the front 2 and back 3 panels are connected to the main body 1 with zippers 102, 104; the bottom of the front 2 and back 3 panels are sewn to the main body 1. Mesh windows 11 are on the sides of the main body 1. Shades 12 are also provided on the outside of the windows. The bottom of the two sides of the main body 1 are harnessed with webbing loops 14. A webbing handle 15 is sewn on the upper portion of the main body 1 (i.e., along the peak of the U-shaped dome). There is an opening 21 on the front panel that allows ingress and egress. A shade 22 covers up the opening 21; the shade 22 is in mesh material.

30 Claims, 4 Drawing Sheets

U.S. PATENT DOCUMENTS

| | | | | |
|---|---|---|---|---|
| 5,931,120 A | * | 8/1999 | Burns et al. | 119/497 |
| 6,021,740 A | | 2/2000 | Martz | |
| 6,076,485 A | * | 6/2000 | Peeples et al. | 119/497 |
| 6,082,305 A | * | 7/2000 | Burns et al. | 119/497 |
| 6,109,281 A | * | 8/2000 | Lowenthal | 135/125 |
| 6,131,534 A | * | 10/2000 | Axelrod | 119/499 |
| 6,155,206 A | | 12/2000 | Godshaw | |
| 6,209,557 B1 | * | 4/2001 | Zheng | 135/126 |
| 6,257,263 B1 | * | 7/2001 | Brereton | 135/126 |
| 6,286,461 B1 | | 9/2001 | Martz | |
| 6,286,462 B1 | * | 9/2001 | Burns | 119/497 |
| 6,289,910 B1 | * | 9/2001 | Zheng | 135/125 |
| 6,334,519 B1 | * | 1/2002 | Tong | 190/107 |
| 6,363,955 B1 | * | 4/2002 | Louie | 135/126 |
| 6,443,274 B1 | * | 9/2002 | Klamm | 190/18 A |
| 6,446,577 B1 | * | 9/2002 | Salahor | 119/497 |

* cited by examiner

PET TENT

FIELD OF THE INVENTION

This patent pertains to the construction of a pet tent where pets can rest. The pet tent has an "upside down U" shape (dome shaped) frame at the front and back panels of the tent; the top of the front and back panels are connected to the main body with zippers; the bottom of the front and back panels are sewn together with the main body; there are mesh windows on the two side panels; there is an opening on the front panel; the opening on the front panel is covered by a mesh shade which can be rolled up and held in place by suitable material such as Velcro® at the top of the front panel; the sides and bottom of the mesh shade are attached to the front panel with zippers; there is no mesh window on the back panel. When the mesh shade on the front panel is unzipped and rolled up, the pet is allowed entrance into the tent for rest; when not in use, the front and back panels of the tent could be unzipped and folded down for storage. The construction is simple and easy to use.

BACKGROUND OF THE INVENTION

As people's living standards increase, raising pets has become a popular hobby for many. Pets bring comfort and joy to their owners. Pets, like people, need rest. Pet-owners are keenly aware of this. Pets need a proper place to rest. Traditional hard surfaced cages and containers do not provide a suitable restful environment for the pet.

SUMMARY OF THE INVENTION

The purpose of this pet tent is to accommodate the needs of both pets and people. When in use, it can be opened up for pets to rest; when not in use, it can be folded down and stored away in a self-contained storage bag.

The design and structure is as follows: this pet tent has a main body, front and back panel; the frame of the front and back panel are in the "upside down U" (dome) shape; the top and sides of the front and back panels are connected to the main body with zippers; the bottom of the front and back panels are sewn to the main body; mesh windows are on the sides of the main body; shades are on the outside of the windows; Velcro® is sewn on the inside of the shades; top of the shades are sewn to the main body of the tent; bottom of the shades are attached to the main body with Velcro®; Velcro® is sewn above the top of the shades; the bottom of the two sides of the main body are harnessed with webbing loops and hardware; webbing handle are sewn on the lid (U-shaped dome); there is an opening on the front panel; a shade covers up the opening; the shade is in mesh material; Velcro® is sewn on the inside of the shade; the top of the shade is sewn to the front panel; the bottom and two sides of the shade is attached to the front panel with zippers; Velcro® is sewn above the top of shade; there is a mesh window on the back panel; shade covers the mesh window; Velcro is sewn on the inside of the shade; the top of the shade is sewn to the back panel; the bottom of the shade is attached to the back panel with Velcro®; Velcro® is sewn above the shade.

When the shade on the front opening is unzipped and rolled up, pets are allowed entrance for rest. When not in use, the front and back panel can be unzipped and folded down for storage. The design is simple and usage is easy.

DETAILED DESCRIPTION OF THE INVENTION

The following description is presented to enable any person skilled in the art to make and use the invention. Various modifications to the embodiments described will be readily apparent to those skilled in the art, and the generic principles defined herein can be applied to other embodiments and applications without departing from the spirit and scope of the present invention as defined by the appended claims. Thus, the present invention is not intended to be limited to the embodiments shown, but is to be accorded the widest scope consistent with the principles and features disclosed herein. To the extent necessary to achieve a complete understanding of the invention disclosed, the specification and drawings of all patents and patent applications cited in this application are incorporated herein by reference.

Figure 1:
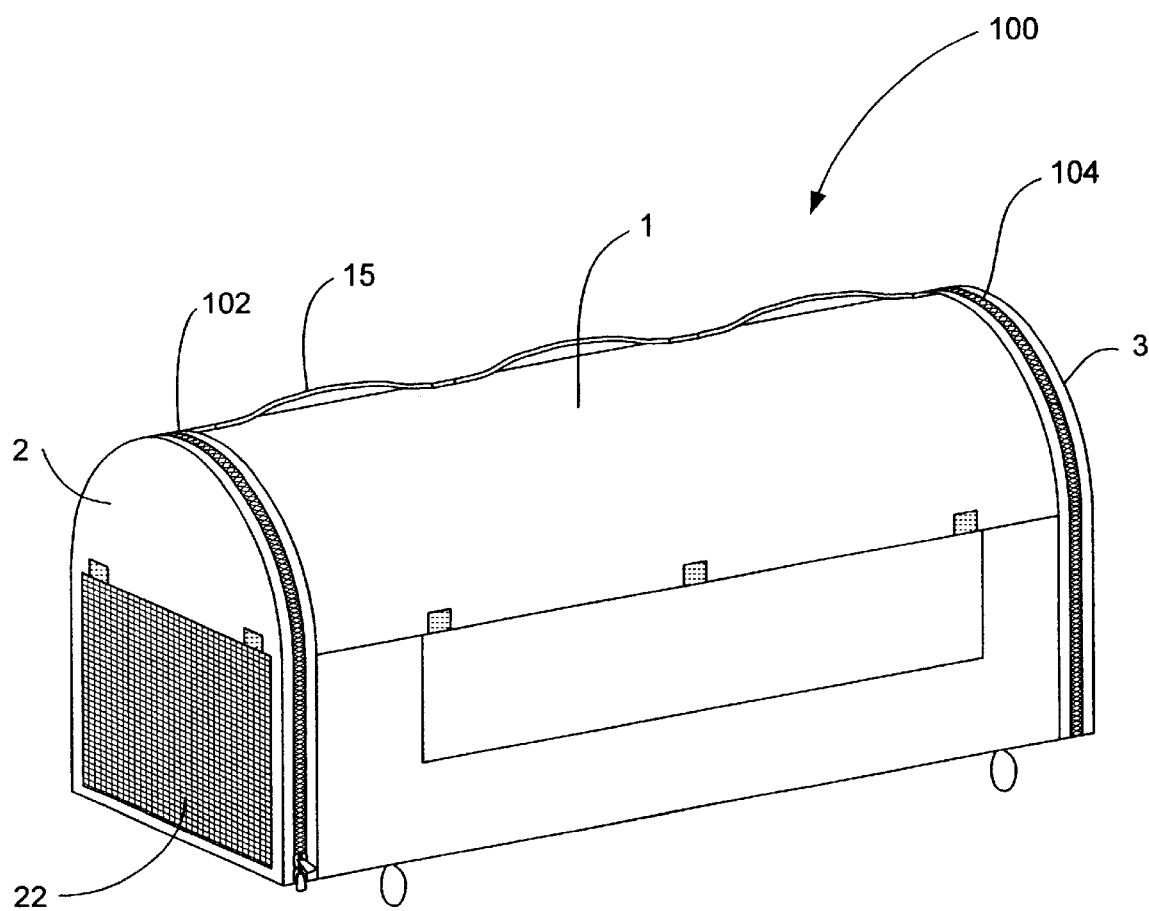
FIG. 1 is a perspective view of the housing.

FIG. 1 illustrates a kind of pet tent 100, including main body 1, front panel 2 and back panel 3. The top and the two sides of front panel 2 and back panel 3 are connected by, for example, one or more zippers 102, 104 to the main body 1. The zippers can function to provide structure to the soft sides of the tent 100. The bottom edges of the front panel 2 and back panel 3 are sewn to the main body 1. There is an opening 21 in the front panel 2 allowing ingress and egress to the interior of the pet tent 100. The opening 21 is covered by a shade 22 while the top of the shade 22 is attached to the front panel 2 along an edge of the shade by a suitable method, such as sewing. The bottom and two sides of the front panel 2 can be connected to the main body 1 with, for example, one or more zippers 102. The shade 22 can also be connected to the front panel when it is in a down position, i.e., covering the opening 21 of the front panel 2. When the shade 22 is open it can either be pulled away from the front panel 2 and, for example, propped up (like an awning), or rolled up and secured to prevent the shade from obscuring the opening 21.

Figure 2:
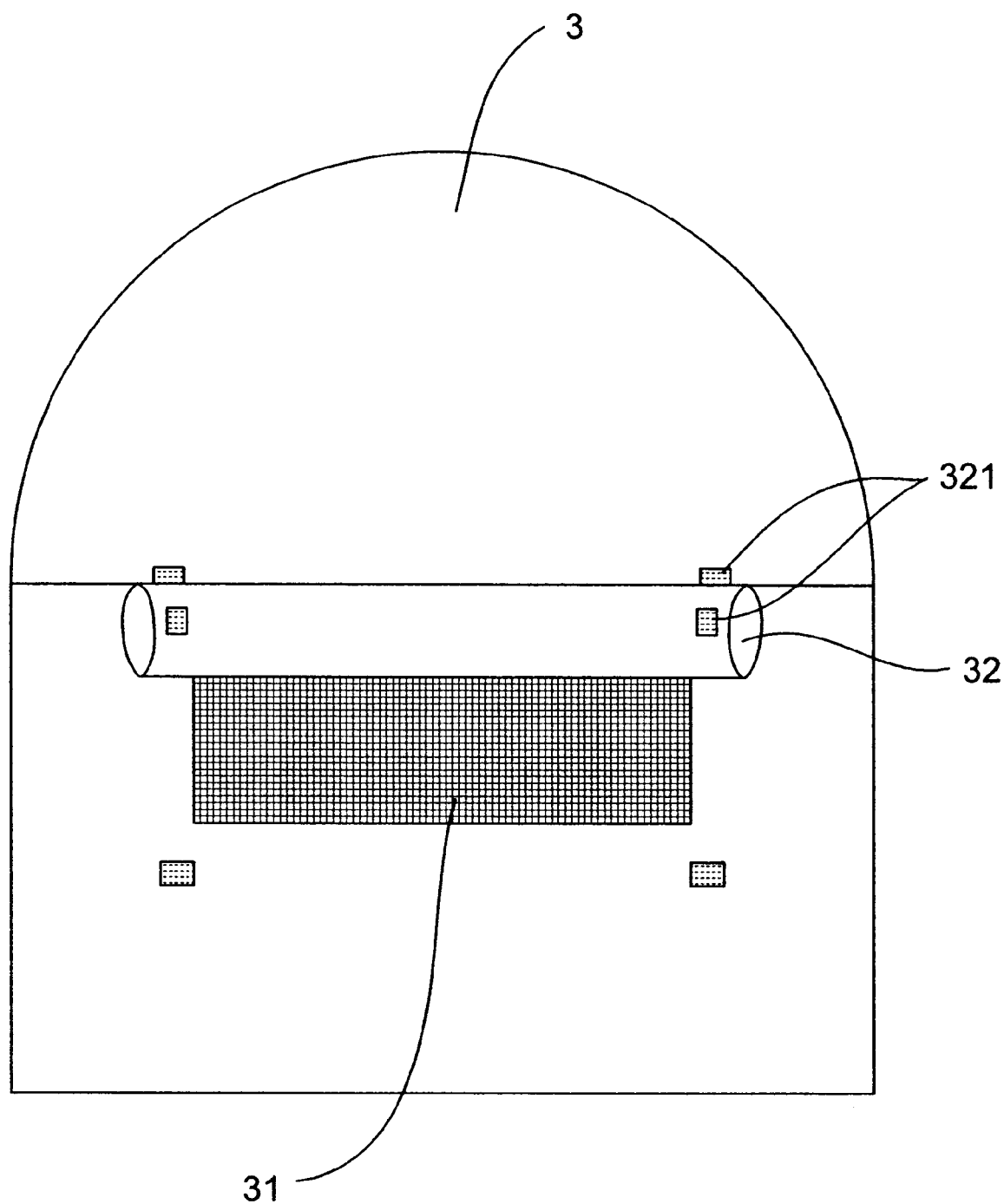
FIG. 2 is a rear view of the housing.

FIG. 2 is a rear view of the pet tent 100. The back panel 3 is in the shape of "upside down U" (dome shape). The mesh window 31 is installed on the back panel 3. Shade 32 covers the mesh window 31. An attaching mechanism, such as Velcro®, 321 is provided on the back panel 3. The Velcro® is sewn on the inside of the shade 32 and on the back panel 3 above the top of the shade 32 as well as on the back panel 3 at or near where the bottom of the shade would abut. In operation, the shade 32 can be kept in a closed position by, for example, adhering the Velcro® on the shade 32 to the Velcro® located on the back panel 3 at or near the lower edge of the shade 32. Alternatively, the shade 32 can be kept in an open position by, for example, rolling the shade 32 and adhering the Velcro® on the shade to the Velcro® located on the back panel 3 at or near the upper edge of the shade 32. When the shade 32 is open the mesh window 31 is visible and air is allowed to pass through the window into the interior of the pet tent 100. Ideally when the shade is down, air is not excluded from the interior of the tent 100 but its access to the interior is slightly impeded. This acts to prevent cold wind and rain from accessing the interior of the tent 100.

Figure 3:
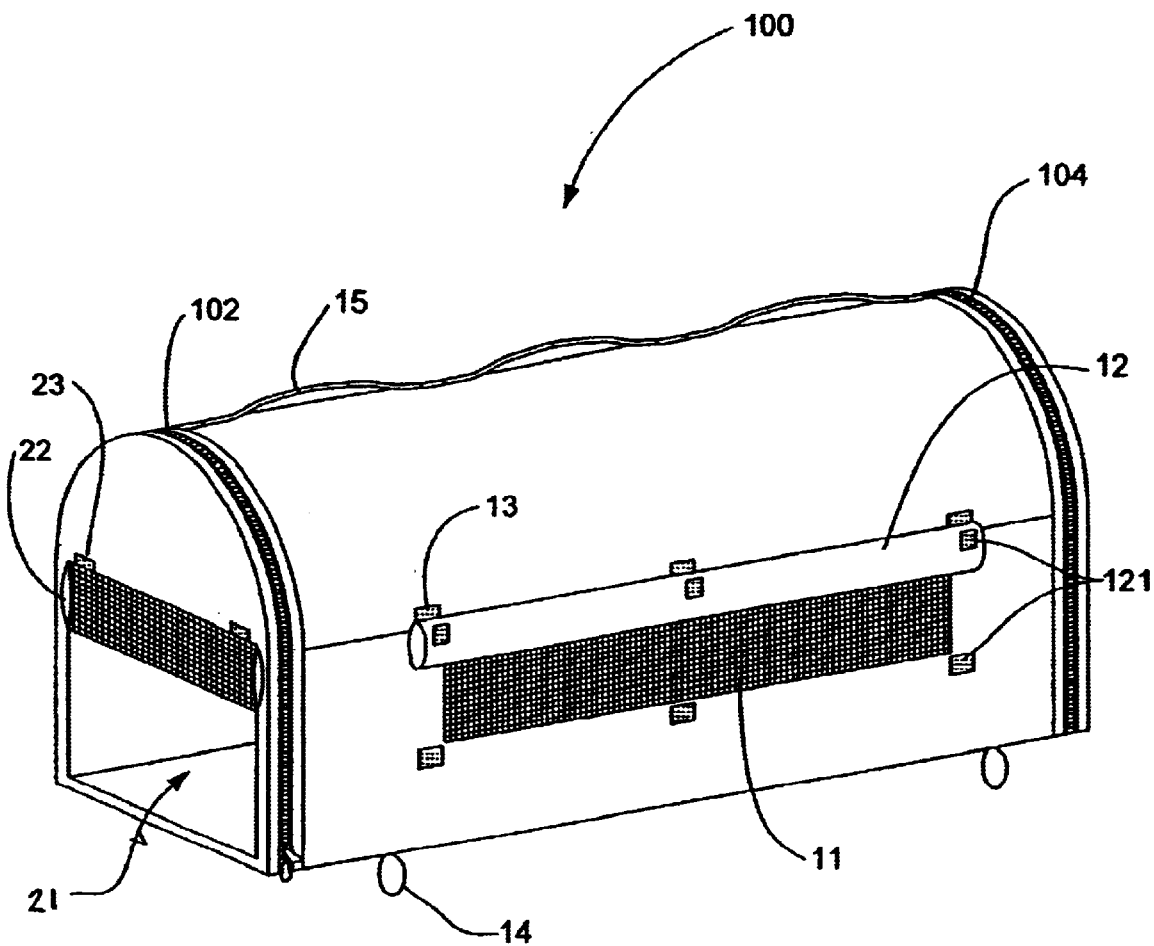
FIG. 3 is a perspective view, as shown in FIG. 1 wherein the front and side shades are rolled to allow access to the housing and ventilation.

FIG. 3 is a perspective view as shown in FIG. 1 wherein the front 22 and side 12 shade panels are rolled to allow access to the interior of the housing and ventilation. Further to the description in FIG. 1, FIG. 3 illustrates mesh windows 11 on the sides of the main body 1. Shade panels 12 cover up the mesh windows 11 when extended or enable air to freely pass through the windows when pulled away from the windows or secured above or below the windows. Velcro® 121 is provided as a mechanism to secure the shade panels 12 in either an open position or a closed position, i.e., a position that enables air to freely pass through the mesh windows unimpeded or a position that covers the window and therefore acts to somewhat restrict the air flow.

The top of the shades 12 are sewn to the main body 1 of the tent 100 while the bottom of the shades are attached to the main body 1 with Velcro® 121 when the shade panel is in the closed position. As will be appreciated by those of skill in the art, the shade panels can be configured such that the panels are sewn to the main body 1 along the lower or side edges and secured by the opposing upper edge without departing from the scope of the invention.

Similar to the description above for the rear panel, Velcro® 13 is sewn above top edge of the shade 12 on the main body and along an area where the bottom edge of the shade panel would abut. The shade panel can then be secured in an open position (i.e., enable the air to pass through the mesh window unimpeded) or a closed position.

Loops 14 are provided along the bottom surface of the pet tent 100 to accommodate hardware, such as stakes. When in use, the pet tent 100 can be secured or anchored to the ground by placing suitable stakes, such as those already known in the art, through the loops and into the ground. A handle 15 is sewn on the top of the tent 100 to enable the pet tent to be picked up and moved easily.

In use, the tent is removed from its stored condition and placed in the desired location. The tent body 1 may first be stabilized by putting stakes through the webbing loops 14. This step may, however, be performed later. The front panel 2 and back panel 3 are pulled upward from the bottom panel of the tent so that the front panel 2 and the back panel 3 are positioned perpendicular to the bottom panel to form the frame of the tent 100. In pulling the front panel 2 and rear panel 3 upward, the main body 1 of the tent takes on its domed shaped configuration and the tent is ready to occupy.

The shade 22 on the front panel 2 can be unzipped and rolled-up. Once rolled up the shade 22 can be held in place to allow ingress and egress to the interior of the tent through the opening 21. Suitable mechanisms for holding up the shade are, for example, ties or the use of Velcro® above the shade 23.

Additionally, pads (not shown) can be placed in the interior of the tent 100 to provide a soft comfortable surface on which the pet can rest. If the owner does not want the pet to exit the tent, he or she can zip up the shade 22 and block the opening 21. Adequate ventilation for the pet can nonetheless be maintained whether the shade 22 is opened or closed by the use of the side windows and back window. Thus, for ventilation, the side windows 12, the main body 1 and the shade 32 on back panel 3 can likewise be rolled up and be held in place with a suitable mechanism such as Velcro® above the window 13, 33. The mesh windows 12, 32 will allow ventilation. If the weather gets cold, the shades 12, 32, can be let down and optionally attached with the Velcro® to the panel 1, 3 at the bottom 11, 31 so that the pets will be kept from cold air.

Figure 4:
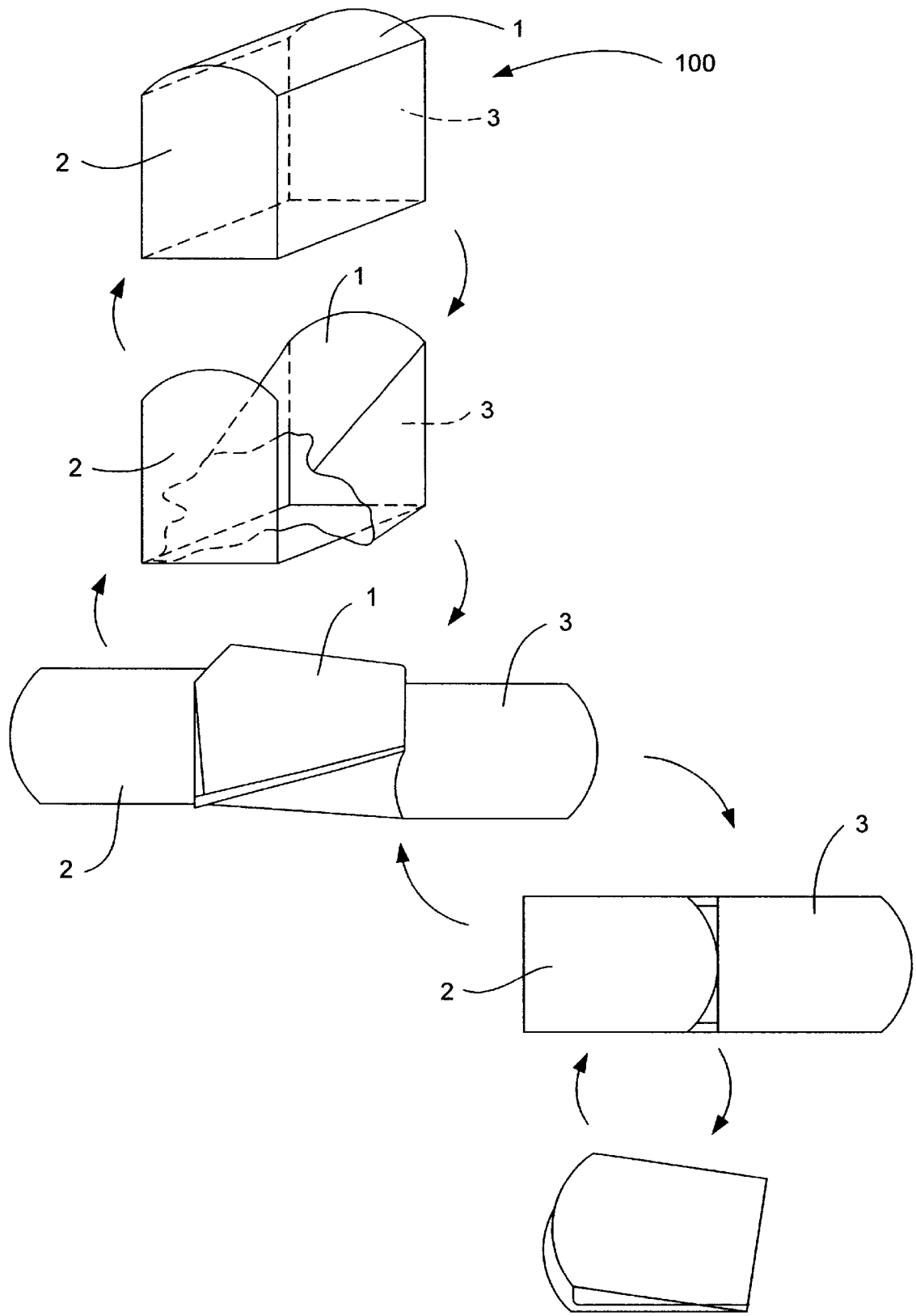
FIG. 4 illustrates the housing being collapsed for storage.

As shown in FIG. 4, when not in use, the zippers 102, 104 which connect the front panel 2 and back panel 3 to the main body 1 are each unzipped. The front panel 2 and back panel 3 can then collapse into a folded down position toward the main body for storage. The configuration of the folded tent is such that the folded tent functions as its own built-in storage bag making storage of the pet tent convenient.

The foregoing description of embodiments of the present invention have been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention and the various embodiments and with various modifications that are suited to the particular use contemplated. It is intended that the scope of the invention be defined by the following claims and its equivalence.

What is claimed:

1. A collapsible housing for accommodating a pet comprising:
   a main body having a bottom side, a first side, a second side, and a top side, said main body forming a continuous structure;
   a front panel, and a back panel, said front panel and said back panel joined to the main body on the bottom side and selectively engagable with the first, second, and top sides; and
   wherein said housing is foldable such that:
      the first, second, and top sides are disengaged from said front and back panels;
      the main body is collapsable so that the first, second, and top sides are collapsed on top of said bottom side; and
      the front panel and the back panel are folded over the collapsed main body with one of the front panel and the back panel folded over the other.

2. The collapsible housing for accommodating a pet of claim 1, wherein the front panel is selectively engagable with the first, second, and top sides of the main body by a zipper.

3. The collapsible housing for accommodating a pet of claim 1, wherein the back panel is selectively engagable with the first, second, and top sides of the main body by a zipper.

4. The collapsible housing for accommodating a pet of claim 1, wherein the front panel further has a front opening that allows access to the collapsible housing for accommodating a pet.

5. The collapsible housing for accommodating a pet of claim 4, wherein the front opening is mesh.

6. The collapsible housing for accommodating a pet of claim 5, wherein a shade is attached to the front panel above the front opening.

7. The collapsible housing for accommodating a pet of claim 6, wherein a bottom side, a first side and a second side of the front shade are connected to the front panel with one or more zippers.

8. The collapsible housing for accommodating a pet of claim 1, at least one of the first side and the second side has a side mesh window.

9. The collapsible housing for accommodating a pet of claim 8 wherein the side mesh window has a side shade.

10. The collapsible housing for accommodating a pet of claim 9 wherein the side shade is securable above the side mesh window.

11. The collapsible housing for accommodating a pet of claim 1, wherein the top side of the main body has a handle attached thereto.

12. The collapsible housing for accommodating a pet of claim 1, wherein the back panel has a back mesh window.

13. The collapsible housing for accommodating a pet of claim 12, wherein the back mesh window has a back shade.

14. The collapsible housing for accommodating a pet of claim 1, further comprising a plurality of loops for accommodating a plurality of stakes.

15. The collapsible housing for accommodating a pet of claim 1, further comprising a pad placed in the interior on the bottom side.

16. A collapsible housing for a pet comprising:
   a main body having a bottom side, first side, a second side, and a curved top side, said main body forming a continuous structure;
   a front panel, and a back panel said front panel and said back panel joined to the main body on the bottom side and selectively engagable with the first, second, and top sides; and
   wherein said housing is foldable such that:
      the first, second, and top sides are disengaged from said from said front and back panels;
      the main body collapsable so that the first, second, and top sides are collapsed on top of said bottom side;
      the front panel and the back panel folded over the collapsed main body with one of the front panel and the back panel folded over the other; and
      wherein the bottom surface is then folded in half.

17. The collapsible housing for a pet of claim 16, further comprising a plurality of loops for accommodating a plurality of stakes.

18. The collapsible housing for a pet of claim 16, wherein the front panel is selectively engagable with the first, second, and top sides of the main body by a zipper.

19. The collapsible housing for a pet of claim 16, wherein the back panel is selectively engagable with the first, second, and top sides of the main body by a zipper.

20. The collapsible housing for a pet of claim 16, wherein the front panel further has a front opening that allows access to the housing.

21. The collapsible housing for a pet of claim 20, wherein the front opening is mesh.

22. The collapsible housing of claim 21, wherein a shade is attached to the front panel above the front opening.

23. The collapsible housing of claim 22, wherein a bottom side, a first side and a second side of the front shade are connected to the front panel with one or more zippers.

24. The collapsible housing for a pet of claim 16, wherein at least one of the first side and the second side has a side mesh window.

25. The collapsible housing for a pet of claim 24, wherein the side mesh window has a side shade.

26. The collapsible housing for a pet of claim 25, wherein the side shade is securable above the side mesh window.

27. The collapsible housing of claim 16, wherein the top side of the main body has a handle attached thereto.

28. The collapsible housing for a pet of claim 16, wherein the back panel has a back mesh window.

29. The collapsible housing for a pet of claim 28, wherein the back mesh window has a back shade.

30. The collapsible housing for accommodating a pet of claim 16, further comprising a pad placed in the interior on the bottom side.

\* \* \* \* \*

(12) EX PARTE REEXAMINATION CERTIFICATE (7913th)
United States Patent
Chou

(10) Number: US 6,715,446 C1
(45) Certificate Issued: Dec. 7, 2010

(54) PET TENT

(75) Inventor: David K. Y. Chou, Hayward, CA (US)

(73) Assignee: Yuntek International, Inc., Hayward, CA (US)

Reexamination Request:
No. 90/010,942, Apr. 5, 2010

Reexamination Certificate for:
Patent No.: 6,715,446
Issued: Apr. 6, 2004
Appl. No.: 10/290,553
Filed: Nov. 8, 2002

(51) Int. Cl.
*A01K 29/00* (2006.01)
*A01K 13/00* (2006.01)
*A45C 7/00* (2006.01)
*E04H 15/40* (2006.01)

(52) U.S. Cl. ............... 119/497; 119/498; 190/107; 135/126; 135/128

(58) Field of Classification Search .......... None
See application file for complete search history.

(56) References Cited

U.S. PATENT DOCUMENTS

| | | |
|---|---|---|
| 4,397,398 A | 8/1983 | Watanabe |
| 4,665,935 A | 5/1987 | Nichols |
| 5,335,618 A | 8/1994 | Zarola |
| 5,918,711 A | 7/1999 | Godshaw |
| 5,931,120 A | 8/1999 | Burns et al. |
| 6,076,485 A | 6/2000 | Peeples et al. |

*Primary Examiner*—Beverly M. Flanagan

(57) ABSTRACT

A collapsible tent 100 for housing a pet which folds into a storage bag when not in use. The design and structure is as follows of the tent includes a main body 1, front 2 and back 3 panels. The frame of the front 2 and back 3 panels are in the "upside down U" (dome) shape; the top and sides of the front 2 and back 3 panels are connected to the main body 1 with zippers 102, 104; the bottom of the front 2 and back 3 panels are sewn to the main body 1. Mesh windows 11 are on the sides of the main body 1. Shades 12 are also provided on the outside of the windows. The bottom of the two sides of the main body 1 are harnessed with webbing loops 14. A webbing handle 15 is sewn on the upper portion of the main body 1 (i.e., along the peak of the U-shaped dome). There is an opening 21 on the front panel that allows ingress and egress. A shade 22 covers up the opening 21; the shade 22 is in mesh material.

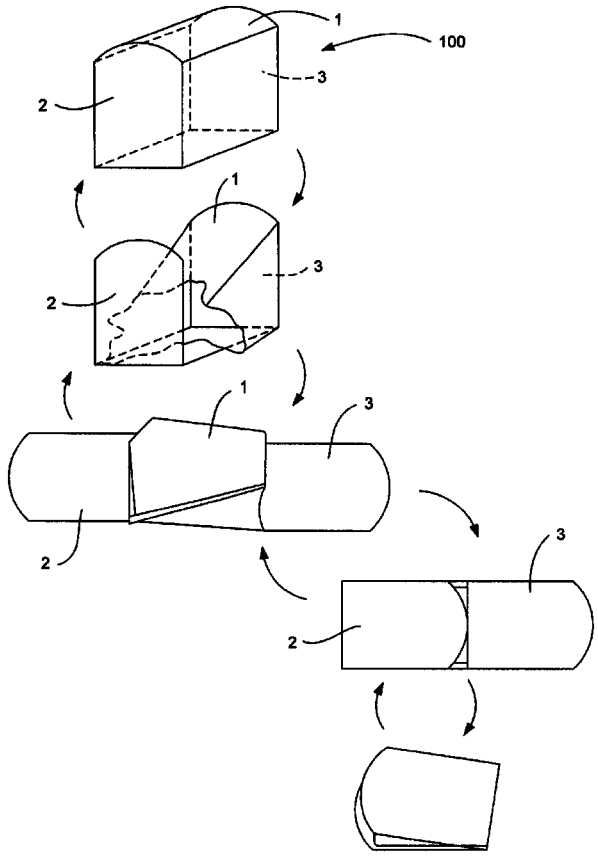

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-15, dependent on an amended claim, are determined to be patentable.

Claims 16-30 were not reexamined.

1. A collapsible housing for accommodating a pet comprising:

a main body having a bottom side, a first side, a second side, and a top side, said main body forming a continuous structure;

a front panel, and a back panel, said front panel and said back panel joined to the main body on the bottom side and selectively engageable with the first, second, and top sides; and wherein said housing is foldable such that:

the first, second, and top sides are disengaged from said front and back panels, *wherein when disengaged, said front and back panels open in a direction parallel to a longest side of the main body*;

the main body is [collapsable] *collapsible* so that the first, second, and top sides are collapsed on top of said bottom side; and the front panel and the back panel are folded over the collapsed main body with one of the front panel and the back panel folded over the other.

* * * * *

(12) INTER PARTES REEXAMINATION CERTIFICATE (0442nd)
United States Patent
Chou

(10) Number: US 6,715,446 C2
(45) Certificate Issued: Aug. 28, 2012

(54) PET TENT

(75) Inventor: David K. Y. Chou, Hayward, CA (US)

(73) Assignee: Yuntek International, Inc., Hayward, CA (US)

Reexamination Request:
No. 95/001,513, Dec. 15, 2010

Reexamination Certificate for:
Patent No.: 6,715,446
Issued: Apr. 6, 2004
Appl. No.: 10/290,553
Filed: Nov. 8, 2002

Reexamination Certificate C1 6,715,446 issued Dec. 7, 2010

(51) Int. Cl.
*A01K 29/00* (2006.01)
*A01K 13/00* (2006.01)
*E04H 15/40* (2006.01)
*A45C 7/00* (2006.01)

(52) U.S. Cl. ............... 119/497; 119/498; 190/107; 135/126; 135/128

(58) Field of Classification Search .............. 119/497
See application file for complete search history.

(56) References Cited

To view the complete listing of prior art documents cited during the proceeding for Reexamination Control Number 95/001,513, please refer to the USPTO's public Patent Application Information Retrieval (PAIR) system under the Display References tab.

*Primary Examiner* — Robert M. Fetsuga

(57) ABSTRACT

A collapsible tent 100 for housing a pet which folds into a storage bag when not in use. The design and structure is as follows of the tent includes a main body 1, front 2 and back 3 panels. The frame of the front 2 and back 3 panels are in the "upside down U" (dome) shape; the top and sides of the front 2 and back 3 panels are connected to the main body 1 with zippers 102, 104; the bottom of the front 2 and back 3 panels are sewn to the main body 1. Mesh windows 11 are on the sides of the main body 1. Shades 12 are also provided on the outside of the windows. The bottom of the two sides of the main body 1 are harnessed with webbing loops 14. A webbing handle 15 is sewn on the upper portion of the main body 1 (i.e., along the peak of the U-shaped dome). There is an opening 21 on the front panel that allows ingress and egress. A shade 22 covers up the opening 21; the shade 22 is in mesh material.

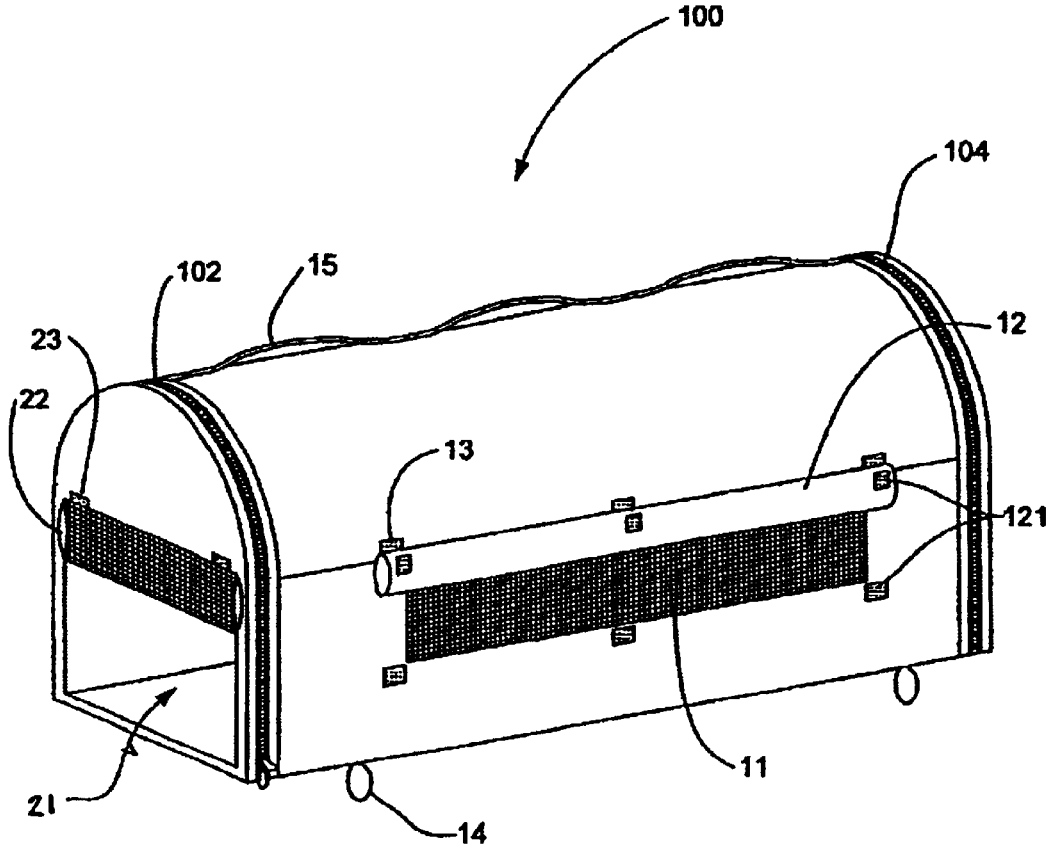

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-5, 8-16 and 20-22 are cancelled.

Claims 6, 7, 17-19, 23, 24, 27, 28 and 30 are determined to be patentable as amended.

Claims 25, 26 and 29, dependent on an amended claim, are determined to be patentable.

New claims 31-65 are added and determined to be patentable.

6. [The collapsible housing for accommodating a pet of claim 5.] *A collapsible housing for accommodating a pet comprising:*
*a main body having a bottom side, a first side, a second side, and a top side, said main body forming a continuous structure;*
*a front panel, and a back panel, said front panel and said back panel joined to the main body on the bottom side and selectively engageable with the first, second, and top sides such that, when arranged substantially perpendicular to the bottom side, said front panel and said back panel form a frame for said housing; and*
wherein said housing is foldable such that:
the first, second, and top sides are disengaged from said front and back panels, wherein when disengaged, said front and back panels open in a direction parallel to a longest side of the main body;
the main body is collapsed so that the first, second, and top sides are collapsed on top of said bottom side; and
the front panel and the back panel are folded over the collapsed main body with one of the front panel and the back panel folded over the other;
wherein the front panel further has a front opening that allows access to the collapsible housing for accommodating a pet;
*wherein the front opening is provided with a front shade made of mesh;*
wherein [a] *the front* shade is attached to the front panel above the front opening; *and wherein a bottom side, a first side and a second side of the front shade are connected to the front panel with one or more zippers.*

7. [The collapsible housing for accommodating a pet of claim 6.] *A collapsible housing for accommodating a pet comprising:*
*a main body having a bottom side, a first side, a second side, and a top side, said main body forming a continuous structure;*
*a front panel, and a back panel, said front panel and said back panel joined to the main body on the bottom side and selectively engageable with the first, second, and top sides;*
wherein the front panel further has a front opening that allows access to the collapsible housing for accommodating a pet;
wherein a front shade is attached to the front panel above the front opening;
wherein the front shade is mesh;
wherein a bottom side, a first side and a second side of the front shade are connected to the front panel with one or more [zippers,] *zippers; and*
*wherein said housing is foldable such that:*
the first, second, and top sides are disengaged from said front and back panels, wherein when disengaged, said front and back panels open in a direction parallel to a longest side of the main body;
the main body is collapsible so that the first, second, and top sides are collapsed on top of said bottom side; and
the front panel and back panel are folded over the collapsed main body with one of the front panel and the back panel folded over the other.

17. The collapsible housing for a pet of [claim 16.] *claim 23*, further comprising a plurality of loops for accommodating a plurality of stakes.

18. The collapsible housing for a pet of [claim 16.] *claim 23*, wherein the front panel is selectively [engagable] *engageable* with the first, second, and top sides of the main body by a zipper.

19. The collapsible housing for a pet of [claim 16.] *claim 23*, wherein the back panel is selectively [engagable] *engageable* with the first, second, and top sides of the main body by a zipper.

23. [The collapsible housing of claim 22.] *A collapsible housing for a pet comprising:*
*a main body having a bottom side, first side, a second side, and a curved top side, said main body forming a continuous structure;*
*a front panel, and a back panel said front panel and said back panel joined to the main body of the bottom side and selectively engageable with a first, second, and top sides;*
*wherein the front panel further has a front opening that allows access to the housing;*
*wherein a front shade is attached to the front panel above the front opening;*
*wherein the front shade is mesh;*
wherein a bottom side, a first side and a second side of the front shade are connected to the front panel with one or more [zippers.] *zippers;*
*wherein said housing is foldable such that:*
*when the first, second, and top sides are disengaged from said front and back panels;*
*the main body is collapsible so that the first, second, and top sides are collapsed on top of said bottom side;*
*the front panel and the back panel folded over the collapsed main body with one of the front panel and the back panel folded over the other; and*
*the bottom side is then folded in half.*

24. The collapsible housing for a pet of [claim 16.] *claim 23*, wherein at least one of the first side and the second side has a side mesh window.

27. The collapsible housing of [claim 16.] *claim 23*, wherein the top side of the main body has a handle attached thereto.

28. The collapsible housing for a pet of [claim 16,] *claim 23,* wherein the back panel has a back mesh window.

30. The collapsible housing for accommodating a pet of [claim 16,] *claim 23,* further comprising a pad placed in the interior on the bottom side.

*31. The collapsible housing for accommodating a pet of claim 7, wherein the front panel is selectively engageable with the first, second, and top sides of the main body by a zipper.*

*32. The collapsible housing for accommodating a pet of claim 7, wherein the back panel is selectively engageable with the first, second, and top sides of the main body by a zipper.*

*33. The collapsible housing for accommodating a pet of claim 7, wherein at least one of the first side and the second side has a side mesh window.*

*34. The collapsible housing for accommodating a pet of claim 33 wherein the side mesh window has a side shade.*

*35. The collapsible housing for accommodating a pet of claim 34 wherein the side shade is securable above the side mesh window.*

*36. The collapsible housing for accommodating a pet of claim 7, wherein the top side of the main body has a handle attached thereto.*

*37. The collapsible housing for accommodating a pet of claim 7, wherein the back panel has a back mesh window.*

*38. The collapsible housing for accommodating a pet of claim 37, wherein the back mesh window has a back shade.*

*39. The collapsible housing for accommodating a pet of claim 7, further comprising a plurality of loops for accommodating a plurality of stakes.*

*40. The collapsible housing for accommodating a pet of claim 7, further comprising a pad placed in the interior on the bottom side.*

*41. A collapsible housing for accommodating a pet comprising:*

*a collapsible main body having a bottom side, a first side, a second side, and a top side, said main body forming a continuous structure;*

*a front panel joined to the main body on the bottom side and selectively engageable with the first, second, and top sides of the main body such that, when disengaged, said front panel opens in a direction parallel to a longest side of the main body;*

*a front opening in said front panel which allows access to the collapsible housing for entry and exit of the pet;*

*a back panel joined to the main body on the bottom side and selectively engageable with the first, second, and top sides of the main body such that when disengaged, said back panel opens in a direction parallel to a longest side of the main body;*

*wherein a front shade is attached to the front panel above the front opening and wherein a bottom side, a first side and a second side of the front shade are connected to the front panel with one or more zippers;*

*wherein the first, second, and top sides of said main body are engaged with said front panel and back panel, and the front panel and back panel are positioned substantially perpendicular to the bottom side of the main body such that the front panel and back panel support said first, second, and top sides of the main body; and*

*wherein, the housing is foldable such that, the first, second, and top sides of said main body are disengaged from said front and back panels, the first, second, and top sides of said main body are collapsed on top of said bottom side of said main body, and the front panel and the back panel are folded over the collapsed main body with one of the front panel and the back panel folded over the other of the front panel and the back panel.*

*42. The collapsible housing for accommodating a pet of claim 41, wherein the front shade comprises mesh.*

*43. The collapsible housing for accommodating a pet of claim 41, wherein the top side of the main body has a handle attached thereto.*

*44. The collapsible housing for accommodating a pet of claim 41, wherein the top side of the main body has a handle sewn thereto.*

*45. The collapsible housing for accommodating a pet of claim 41, wherein the front panel is selectively engageable with the first, second, and top sides of the main body by a zipper.*

*46. The collapsible housing for accommodating a pet of claim 41, wherein the back panel is selectively engageable with the first, second, and top sides of the main body by a zipper.*

*47. The collapsible housing for accommodating a pet of claim 41, wherein at least one of the first side and the second side has a side mesh window.*

*48. The collapsible housing for accommodating a pet of claim 47, wherein the side mesh window has a side shade.*

*49. The collapsible housing for accommodating a pet of claim 48, wherein the side shade comprises a fastener to secure the side shade above the side mesh window.*

*50. The collapsible housing for accommodating a pet of claim 41, wherein the back panel has a back mesh window.*

*51. The collapsible housing for accommodating a pet of claim 50, wherein the back mesh window has a back shade.*

*52. The collapsible housing for accommodating a pet of claim 41, further comprising a plurality of loops connected to the bottom side of the main body for accommodating a plurality of stakes.*

*53. The collapsible housing for accommodating a pet of claim 41, further comprising a pad positioned inside the main body on top of the bottom side of the main body.*

*54. A collapsible housing for accommodating a pet comprising:*

*a collapsible main body having a bottom side, a first side, a second side, and a top side, said main body forming a continuous structure;*

*a front panel joined to the main body on the bottom side and selectively engageable with a zipper to the first, second, and top sides of the main body such that, when disengaged, said front panel opens in a direction parallel to a longest side of the main body;*

*a front opening in said front panel which allows access to the collapsible housing for entry and exit of the pet;*

*a front mesh shade attached to the front panel above the front opening wherein a bottom side, a first side and a second side of the front mesh shade are selectively engageable with one or more zippers to the front panel;*

*a back panel joined to the main body on the bottom side and selectively engageable with a zipper to the first, second, and top sides of the main body such that when disengaged, said back panel opens in a direction parallel to a longest side of the main body;*

*wherein the first, second, and top sides of said main body are engaged with said front panel and back panel, and the front panel and the back panel are positioned substantially perpendicular to the bottom side of the main body such that the front panel and back panel support said first, second, and top sides of the main body;* wherein, the collapsible housing is foldable such that the first, second, and top sides of said main body are disengaged from said front and back panels, the first, second, and top sides of said main body are collapsed on top of said bottom side of said main body, and the front panel and the back panel are folded over the collapsed main body with one of the front panel and the back panel folded over the other of the front panel and the back panel.

55. The collapsible housing for accommodating a pet of claim 54, further comprising a handle attached to said top side of said main body.

56. The collapsible housing for accommodating a pet of claim 54, further comprising a handle sewn to the top side of the main body.

57. The collapsible housing for accommodating a pet of claim 54, further comprising:
   a first mesh window in the first side; and
   a second mesh window in the second side.

58. The collapsible housing for accommodating a pet of claim 54, further comprising:
   a first mesh window in the first side;
   a second mesh window in the second side;
   a first shade securable over the first mesh window; and
   a second shade securable over the second mesh window.

59. The collapsible housing for accommodating a pet of claim 54, further comprising:
   a first mesh window in the first side;
   a second mesh window in the back panel;
   a first side shade securable over the first mesh window; and
   a second side shade securable over the second mesh window.

60. The collapsible housing for accommodating a pet of claim 54, further comprising:
   a first mesh window in the first side;
   a second mesh window in the second side;
   a first shade securable over the first mesh window;
   a second shade securable over the second mesh window;
   a first fastener for holding open the first mesh window; and
   a second fastener for holding open the second mesh window.

61. The collapsible housing for accommodating a pet of claim 54, further comprising:
   a first mesh window in the first side;
   a second mesh window in the back panel;
   a first side shade securable over the first mesh window;
   a second side shade securable over the second mesh window;
   a first fastener for holding open the first mesh window; and
   a second fasterner for holding open the second mesh window.

62. The collapsible housing for accommodating a pet of claim 54, further comprising a plurality of loops connected to the bottom side for accommodating a plurality of stakes.

63. The collapsible housing for accommodating a pet of claim 54, further comprising a plurality of loops connected to the bottom side for accommodating a plurality of stakes and in combination with a plurality of stakes for securing said collapsible housing to the ground.

64. The collapsible housing for accommodating a pet of claim 54, further comprising a pad placed inside the housing covering the bottom side of said main body.

65. The collapsible housing for accommodating a pet of claim 54, further comprising a fastener for holding open the front mesh shade.

* * * * *